US007443783B2

(12) United States Patent
DeChamps et al.

(10) Patent No.: US 7,443,783 B2
(45) Date of Patent: Oct. 28, 2008

(54) I/Q MISMATCH COMPENSATION IN AN OFDM RECEIVER IN PRESENCE OF FREQUENCY OFFSET

(75) Inventors: Paul DeChamps, Prevessin-Moens (FR); Francois Bourzeix, Ornex (FR); Sebastien Simoens, Gif-sur-Yvette (FR)

(73) Assignee: Freescale Semiconductor, Inc., Austin, TX (US)

( * ) Notice: Subject to any disclaimer, the term of this patent is extended or adjusted under 35 U.S.C. 154(b) by 658 days.

(21) Appl. No.: 10/504,456

(22) PCT Filed: Feb. 18, 2003

(86) PCT No.: PCT/EP03/01615

§ 371 (c)(1),
(2), (4) Date: Mar. 4, 2005

(87) PCT Pub. No.: WO03/071758

PCT Pub. Date: Aug. 28, 2003

(65) Prior Publication Data

US 2005/0152463 A1 Jul. 14, 2005

(30) Foreign Application Priority Data

Feb. 21, 2002 (EP) .................................. 02290417

(51) Int. Cl.
*H04J 11/00* (2006.01)
(52) U.S. Cl. ...................... 370/208; 370/210; 375/260
(58) Field of Classification Search ................ 370/203, 370/206, 342, 428, 480; 375/130, 148, 149, 375/150, 222, 260, 343, 346, 350, 375
See application file for complete search history.

(56) References Cited

U.S. PATENT DOCUMENTS

| 6,985,432 | B1 * | 1/2006 | Hadad ......................... 370/203 |
| 7,075,967 | B2 * | 7/2006 | Struhsaker et al. .......... 375/130 |
| 7,139,320 | B1 * | 11/2006 | Singh et al. ................. 375/260 |
| 7,154,936 | B2 * | 12/2006 | Bjerke et al. ................ 375/148 |
| 2002/0048333 | A1 * | 4/2002 | Ahmed et al. ............... 375/346 |

FOREIGN PATENT DOCUMENTS

GB 2349285 A 10/2000
WO WO 01/26317 A1 4/2001

OTHER PUBLICATIONS

Miyagi et al., "An Alias-Free Subband Adaptive Equalizer for OFDM System," IEEE, pp. 2413-2416 (2001).
Liu. "Impacts of I/Q Imbalance on QPSK-OFDM-QAM Detection," IEEE Transactions on Consumer Electronics, vol. 44, No. 3, Aug. 1998, pp. 984-989.
PCT/EP03/01615 International Search Report.

* cited by examiner

*Primary Examiner*—Bob A Phunkulh (57) ABSTRACT

A receiver for an orthogonal frequency division multiplex radio signal in which a carrier frequency is modulated by sub-carrier signals (S1) coded with data. Analogue signal processing means (3 to 12) produces base-band analogue signals (I-Rx, Q-Rx) in phase quadrature and analogue-to-digital converters (13, 14) convert the analogue signals to phase quadrature digital signals (xI(n), xq(n)). The digital signal processor includes the OFDM demodulator (15) and mismatch compensation (17, 18). The mismatch compensation (17, 18) combines each of the reproduced sub-carrier signals (RI) with a limited number of the reproduced sub-carrier signals (RI-Rk) according to respective frequency offset coefficient (I, k) that is a function of an estimated value of the offset (fc) of the reference frequency relative to the carrier frequency.

11 Claims, 6 Drawing Sheets

I/Q MISMATCH COMPENSATION IN AN OFDM RECEIVER IN PRESENCE OF FREQUENCY OFFSET

FIELD OF THE INVENTION

This invention relates to an orthogonal frequency division multiplex ('OFDM') receiver with compensation for frequency offset. As used herein, 'receiver' refers to apparatus capable of receiving a radio signal, whether or not it is also capable of transmitting a radio signal.

BACKGROUND OF THE INVENTION

OFDM transmissions are widely used. Examples of their use include Digital Video Broadcast (DVB), Digital Audio Broadcast (DAB), and wireless broadband transmission standards such as IEEE 802.11a, ETSI/BRAN/Hiperlan2 and ARIB/MMAC/HiSWAN.

An OFDM transmitter/receiver ('transceiver') includes an analogue signal processing part, the RF front-end, and a digital signal processing (DSP) part, also referred to as the base-band digital IC. In the reception direction, the function of the RF front-end is to convert the OFDM signal from the RF frequency (e.g. 5 GHz in IEEE802.11a) to base-band, and to generate the in-phase (I) and quadrature (Q) components of the base-band signal. The digitised I and Q signals are then processed by the DSP unit. There are two basic architectures to generate I and Q digital signals:

- The first architecture, which is not utilised by the present invention, is known as digital I/Q generation. In digital I/Q generation, the RF signal is converted to a low intermediate frequency (IF) (for example 20 MHz in IEEE802.11a) and sampled at a relatively high frequency (e.g. greater than 40 MHz in IEEE802.11a) by a single Analogue to Digital Converter (ADC). The single digitised signal is then processed by the DSP unit, which digitally generates the I and Q signals and processes them. A drawback of this architecture is that it is power consuming and increases the complexity of the DSP. Also, many I/Q compensation techniques only deal with a mismatch that remains constant over the whole frequency band of the signal and only give good results for narrow band signals.
- The second architecture is called analogue I/Q generation. An example of a transceiver in conformity with the IEEE802.11a standards with this architecture as disclosed in our co-pending European Patent Application N° EP 01401631.5 filed 20 Jun. 2001 is shown in FIG. 1 and the signals appearing in operation at various stages of the receiver are shown in FIG. 2.

Figure 1:
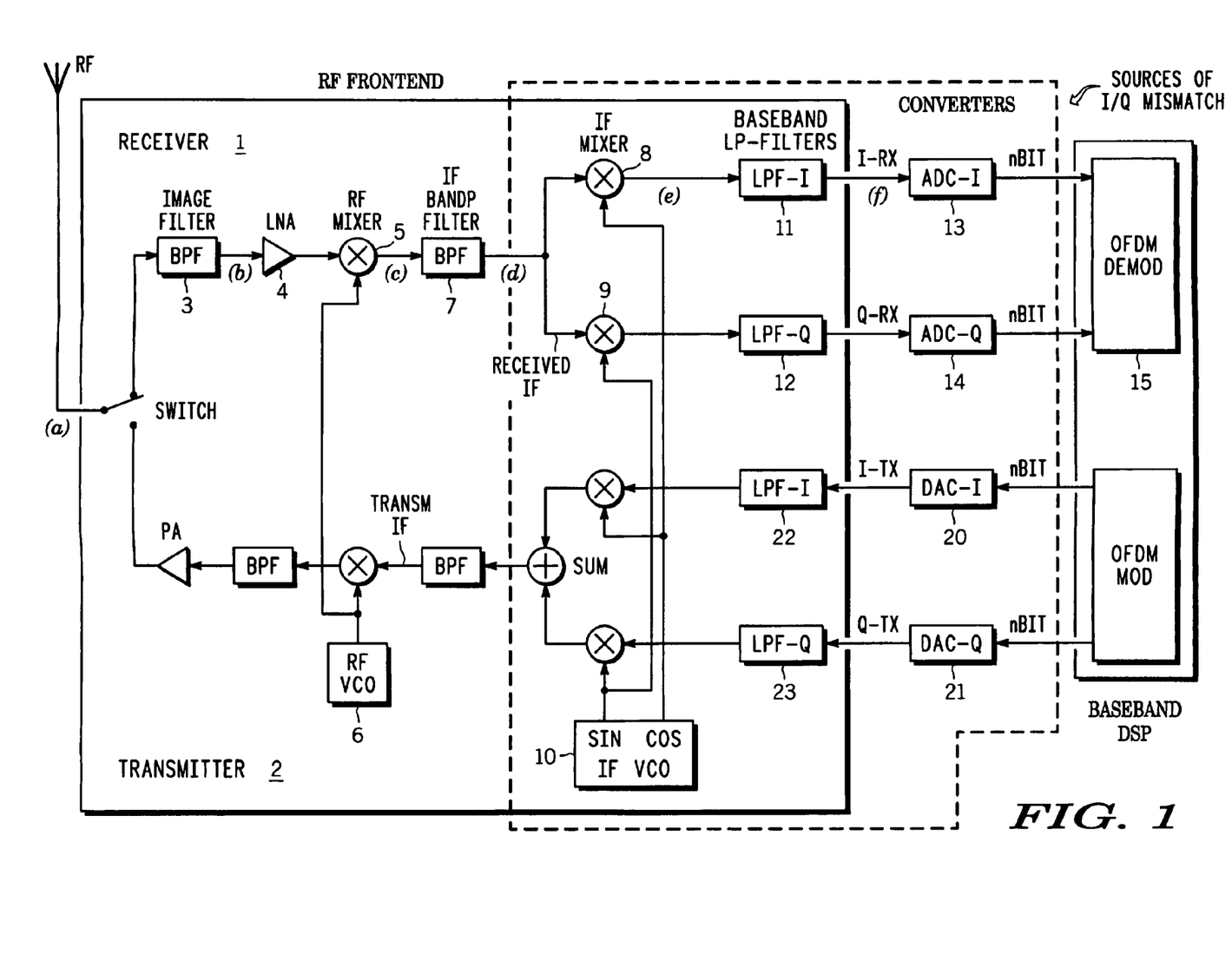
FIG. 1 is a schematic diagram of a transceiver including an OFDM receiver.
Figure 2:
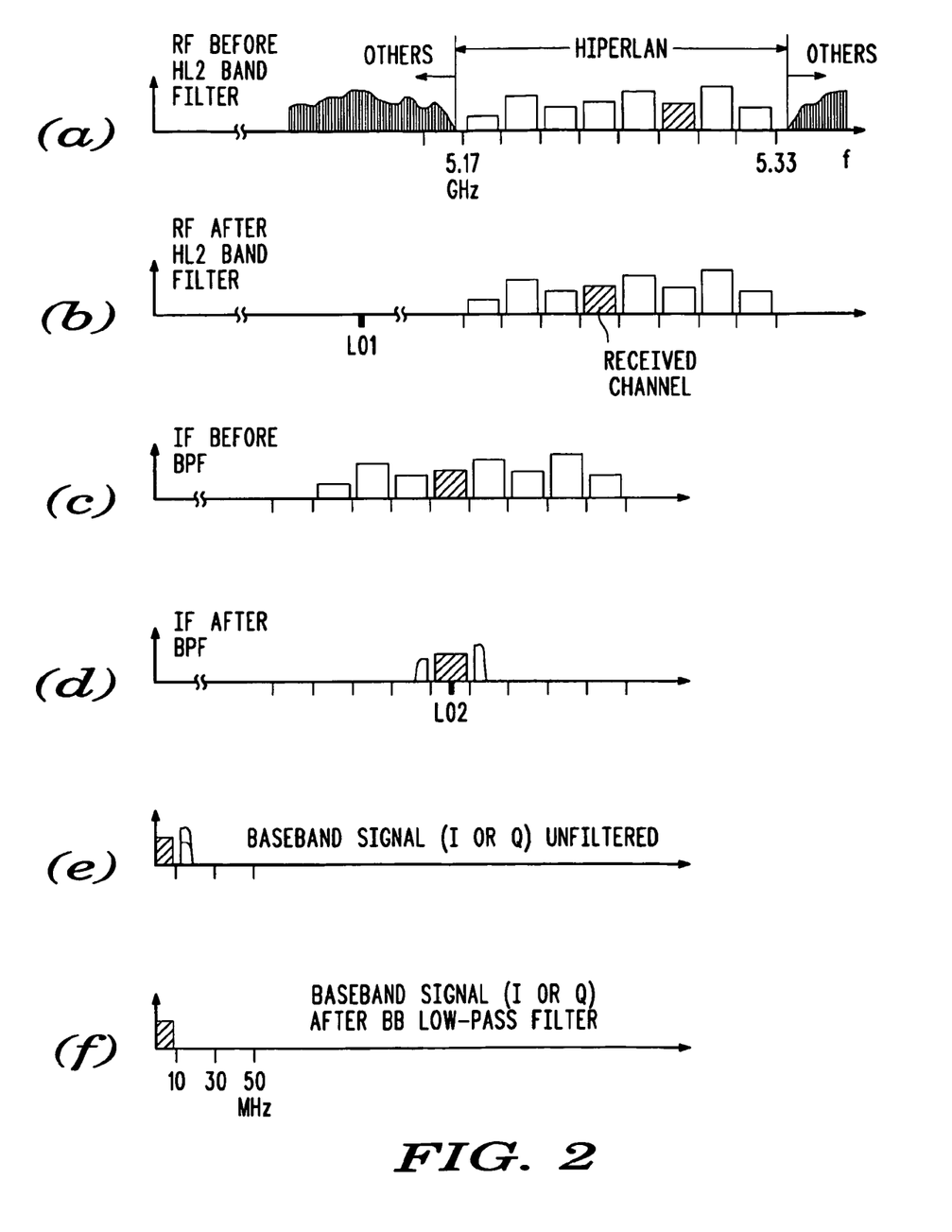
FIG. 2 is a graphical diagram of typical frequency distributions of signals appearing at different points in the receiver of FIG. 1.

An analogue I/Q receiver may include a first down-conversion stage, which converts the RF signal to an intermediate frequency, as shown in FIGS. 1 and 2. However it is also possible for the receiver to convert the RF signal directly down to base-band.

The transceiver illustrated in FIGS. 1 and 2 comprises an analogue I/Q receiver section 1 and a transmitter section 2. In the analogue receiver section 1, the RF signal is filtered in a band-pass filter 3, amplified in a low-noise amplifier 4, converted down to intermediate frequency by mixing in a mixer 5 with an RF signal generated locally by a voltage controlled oscillator 6 and filtered in a band-pass filter 7. The IF signal is then mixed in two mixers 8 and 9 with two sine waves produced by a voltage controlled oscillator 10 and which have the same IF frequency with a phase difference of 90 degrees, so as to generate the base-band I and Q signals. The I and Q signals are filtered by respective low-pass filters 11 and 12. Then they are digitised using respective analogue-to-digital converters 13 and 14 and demodulated in an OFDM demodulator 15. The two ADCs are typically clocked at a frequency that is at least a factor of two lower than in digital I/Q receivers, which reduces the circuit area and power consumption and also simplifies the base-band digital IC compared to a receiver using digital I/Q generation.

Analogue I/Q generation has been found to be more difficult to implement than digital I/Q generation, however, because avoiding signal impairment (such as cross-talk between the sub-carriers especially, for example) has required high quality matching between the I and Q signal paths. The analogue treatment of the I/Q signals is sensitive to mismatch. Such mismatch arises from slight differences in the values and behaviour of active and passive elements found in the I and Q signal paths, even though great care is taken in the design and layout of these elements in a symmetrical way during the design of the system and/or circuit. Mismatches are even more pronounced when the effects of thermal drift are taken into account.

The present invention enables signal impairments to be reduced without requiring such high quality matching between the I and Q signal paths. The overall solution combines the advantages of a high quality signal and a low power consumption and circuit area.

SUMMARY OF THE INVENTION

The present invention provides a receiver for an orthogonal frequency division multiplex radio signal as described in the accompanying claims.

DETAILED DESCRIPTION OF THE PREFERRED EMBODIMENTS

Our co-pending European Patent Application N° EP 01401631.5 filed 20 Jun. 2001 describes a digital method for mismatch compensation of the I and Q paths of an OFDM transmitter or receiver implementing analogue I/Q generation. FIGS. 1 and 2 (taken from our co-pending European Patent Application) show an OFDM transceiver system with the sources of the I/Q mismatch and the analogue signals in the receiver (in the context of an architecture with one IF frequency).

The method that is described in our co-pending European Patent Application allows the compensation of the I/Q mismatch in an OFDM receiver when there is no offset or a negligible offset between the transmitter and the receiver carrier frequency. However, when the carrier frequency offset becomes bigger, the data transmission quality degrades very quickly (i.e. higher bit error rate) and it becomes necessary to implement a different compensation method.

Figure 3:
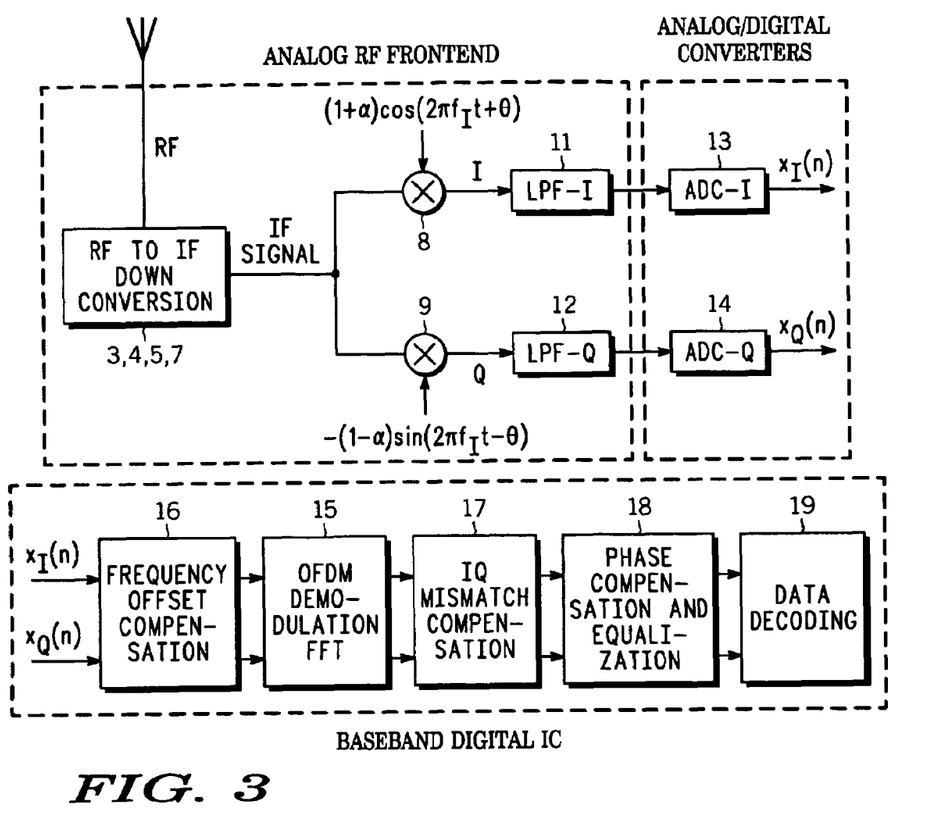
FIG. 3 is a block schematic diagram of compensation circuits incorporated in the receiver of FIG. 1 in accordance with one embodiment of the present invention, given by way of example.

The embodiment of the present invention shown in FIG. 3 is applicable to any OFDM receiver implementing analogue I/Q generation, compliant or not with the wireless broadband transmission standards such as IEEE 802.11a, ETSI/BRAN/Hiperlan2 and ARIB/MMAC/HiSWAN mentioned above. In this embodiment of the invention, the I and Q mismatch is compensated in the digital signal processor ('DSP') part of the OFDM receiver, taking advantage of the specific properties of OFDM signals. This compensation substantially reduces the signal impairments with little increase in DSP complexity. The overall solution combines the advantages of a high quality signal and a low power consumption and circuit area.

FIG. 3 is a block diagram of the processing section of an analogue I/Q receiver of the kind shown in FIG. 1, similar references being used to designate similar elements. The upper part of FIG. 3 represents the RF front-end and the lower part represents the processing section of the DSP.

The two digital signals $x_I(n)$ and $x_Q(n)$ from the ADCs 13 and 14 are sent to the DSP which implements the functions described below:

As in most OFDM systems, the receiver (and transmitter) generates its clock signals internally from its own crystal (not shown). During data transmission, the receiver is tuned nominally to the same channel as the transmitter from which it is receiving the signals but a frequency offset equal to the difference between the transmitter and the receiver carrier central frequency usually appears. When the digital I and Q signals enter the DSP, this carrier frequency offset is compensated in the time domain by a frequency offset compensation circuit 16.

The OFDM demodulator 15 performs a fast Fourier transform ('FFT') by converting the time domain signals to the frequency domain and recovers the sub-carriers that were transmitted.

An I/Q mismatch compensation block 17 removes cross-talk between sub-carriers, which is generated by the mismatch between the analogue components of the I and Q channels, especially the IF mixers, the low pass filter and the analogue to digital converter. The I/Q mismatch compensation method is described in more detail below.

The signals then pass to a phase offset compensation and equalisation circuit 18.

Finally, the data is decoded from the compensated sub-carriers in a circuit 19.

Cross-talk between sub-carriers is generated In operation of an OFDM receiver without compensation after the conversion from IF to base-band by the mismatch between the analogue components of the I and Q channels and increases the data transmission error rate. This cross-talk will now be described by equations and the method to remove this cross-talk in order to improve the data transmission quality will then be analysed.

In the time domain, an OFDM signal is the sum of K sinusoidal waveforms, that is to say the sub-carriers that carry the data to be transmitted. Each sub-carrier's amplitude and phase is represented by the complex element $S_k$ with k=[−K/2, −1, . . . , +1, +K/2].

The OFDM signal is transmitted after being up converted with a central carrier frequency $f_c$. Then, each sub-carrier is sent at the frequency $f_c + kf_s/N$, with N being the size of the inverse fast Fourier transform ('IFFT') being used for the OFDM modulation and $f_s$ the sampling frequency. The signal at the transmitter antenna is represented by the following equation:

$$x(t) = \mathrm{Re}\left(\sum_{k=-\frac{K}{2}}^{k=\frac{K}{2}} S_k e^{\left(j2\pi\left(f_c + \frac{k}{N}f_s\right)t\right)}\right) \quad \text{Equation 1}$$

Figure 4:
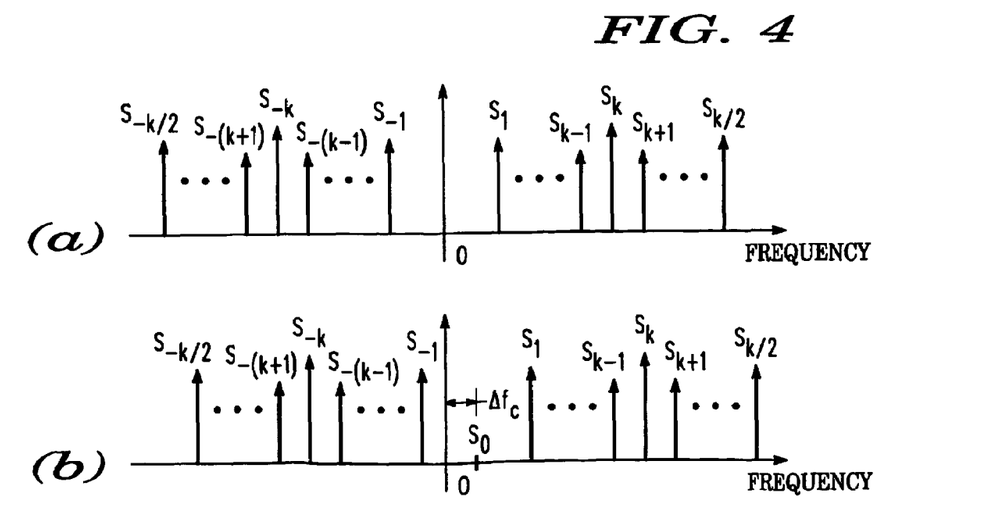
FIG. 4 is a graphical diagram of typical frequency distributions of base-band sub-carrier signals in operation of the receiver of FIG. 1 without compensation circuits, both without and with frequency offset.

In the receiver, after down conversion to base-band, the sub-carriers are placed symmetrically around the DC frequency if there is no carrier frequency offset as shown in the upper part of FIG. 4. With the presence of a carrier frequency offset $\Delta f_c$ between the transmitter and the receiver, the sub-carriers are shifted by $\Delta f_c$, as shown in the lower part of FIG. 4.

In a receiver system working with analogue I/Q generation, the essential path mismatch originates from the analogue part imperfections. Putting $G_k$ as the common gain for the I and Q path, $\alpha_k$ and $\theta_k$ as the low pass filter and A/D converter amplitude mismatch and phase mismatch, they are function of the sub-carrier k frequency. The IF mixers have an amplitude mismatch $\alpha$ and a phase mismatch $\theta$ that are independent of the sub-carrier frequency. Then, the I and Q samples at the output of the receiver A/D converters are modelled as follows:

$$x_I(n) = \mathrm{Re}\left(\sum_{k=-\frac{K}{2}}^{k=\frac{K}{2}} (1+\alpha)(1+\alpha_k) e^{(j(\theta+\theta_k))} G_k S_k e^{\left(j2\pi\frac{n\cdot k}{N}\right)} e^{j\left(2\pi\frac{\Delta f_c}{f_s}n + \varphi_0\right)}\right)$$

$$x_Q(n) = \mathrm{Im}\left(\sum_{k=-\frac{K}{2}}^{k=\frac{K}{2}} (1-\alpha)(1-\alpha_k) e^{(-j(\theta+\theta_k))} G_k S_k e^{\left(j2\pi\frac{n\cdot k}{N}\right)} e^{j\left(2\pi\frac{\Delta f_c}{f_s}n + \varphi_0\right)}\right)$$

We consider $\alpha$ and $\alpha_k$ to be small compared to 1. Then, for sub-carrier k, the overall amplitude mismatch can be represented by $a_k$ and the overall phase mismatch by $\phi_k$, with $a_k = \alpha + \alpha_k$ and $\phi_k = \theta + \theta_k$. The I and Q samples at the output of the receiver A/D converters can be described as follows:

$$x_I(n) = \mathrm{Re}\left(\sum_{k=-\frac{K}{2}}^{k=\frac{K}{2}} (1+\alpha_k) e^{(j\phi_k)} G_k S_k e^{\left(j2\pi\frac{n\cdot k}{N}\right)} e^{j\left(2\pi\frac{\Delta f_c}{f_s}n + \varphi_0\right)}\right) \quad \text{Equation 2}$$

$$x_Q(n) = \mathrm{Im}\left(\sum_{k=-\frac{K}{2}}^{k=\frac{K}{2}} (1-\alpha_k) e^{(-j\phi_k)} G_k S_k e^{\left(j2\pi\frac{n\cdot k}{N}\right)} e^{j\left(2\pi\frac{\Delta f_c}{f_s}n + \varphi_0\right)}\right) \quad \text{Equation 3}$$

where n=−E . . . −1,0,1 . . . N−1, E being the length of the cyclic extension and $\phi_0$ the phase offset for the first sample.

The complex signal before the frequency offset compensation is:

$$x(n) = x_I(n) + j \cdot x_Q(n) \qquad \text{Equation 4}$$

$$= \sum_{k=-\frac{K}{2}}^{k=\frac{K}{2}} (I_k G_k S_k C_n + J_k \overline{G}_{-k} \overline{S}_{-k} \overline{C}_n) e^{j2\pi \frac{n \cdot k}{N}}$$

where $$I_k = \cos(\phi_k) - j \cdot a_k \sin(\phi_k),$$

$$J_k = a_k \cdot \cos(\phi_k) + j \cdot \sin(\phi_k) \ \& \ C_n = e^{j\left(2\pi \frac{\Delta f_C}{f_s} n + \varphi_0\right)}.$$

The offset frequency compensation is implemented in the time domain by multiplying the received samples by $$e^{-j\left(2\pi \frac{\Delta f_C}{f_s} n + \varphi_1\right)},$$

where n=0,1 ... N−1.

The demodulation is performed by a fast Fourier transform on the useful samples. The received sub-carrier $R_I$ is described by the following equations:

$$R_l = I_l G_l S_l e^{j(\varphi_0 + \varphi_1)} + \qquad \text{Equation 5}$$

$$e^{-j(\varphi_0 + \varphi_1)} \sum_{k=-\frac{K}{2}}^{k=\frac{K}{2}} \lambda_{l,k} \frac{J_k}{I_k} \overline{I}_{-k} \overline{G}_{-k} \overline{S}_{-k}$$

with $$\lambda_{l,k} = \frac{1}{N} e^{j\pi(N-1)\left(\frac{k-l}{N} - 2\frac{\Delta f_c}{f_s}\right)} \frac{\sin\left(\pi N\left(\frac{k-l}{N} - 2\frac{\Delta f_c}{f_s}\right)\right)}{\sin\left(\pi\left(\frac{k-l}{N} - 2\frac{\Delta f_c}{f_s}\right)\right)} \qquad \text{Equation 6}$$

Equation 5 shows that each received sub-carrier $R_I$ is the sum of the transmitted sub-carrier $S_I$ multiplied by the coefficient $I_I$ and the channel gain $G_I$ plus a cross-talk (right-hand term), which is dependent on all the other sub-carriers.

Since the phase $\phi_1$ is known, it can be set to zero for simplification. Furthermore, it is known that the effect of a clock frequency offset on the frequency domain symbol is a rotation of sub-carrier k by a phase that depends on the sub-carrier frequency and is denoted by $\phi_{VPE}(k)$. It can be verified that in the presence of I/Q imbalance, carrier and clock frequency offset, Equation 5 is modified as follows:

$$R_l = I_l G_l S_l e^{j\varphi_0} e^{j\varphi_{VPE}(k)} + \qquad \text{Equation 7}$$

$$\sum_{k=-\frac{K}{2}}^{k=\frac{K}{2}} \lambda_{l,k} \frac{J_k}{I_k} \overline{e^{j\varphi_0} e^{j\varphi_{VPE}(-k)} \overline{I}_{-k} \overline{G}_{-k} \overline{S}_{-k}}$$

The I/Q mismatch that is represented in these equations is compensated as follows in this embodiment of the present invention.

Based on equation 7, and the assumption that the cross-talk term remains small compared to the left-hand term, the compensation is implemented by subtracting the cross-talk from the received signal. Then, the corrected signal $Z_I$ is defined by the equation below:

$$Z_l = R_l - \sum_{k=-\frac{K}{2}}^{k=\frac{K}{2}} \lambda_{l,k} \frac{J_k}{I_k} \overline{R}_{-k} \qquad \text{Equation 8}$$

$$= R_l - \sum_{k=-\frac{K}{2}}^{k=\frac{K}{2}} \lambda_{l,k} A_k \overline{R}_{-k} \quad \text{and}$$

$$S_l = \frac{Z_l e^{-j\phi_{VPE}(k)}}{I_l G_l} \qquad \text{Equation 9}$$

where $R_I$ is the received signal and $S_I$ is the original transmitted signal. As shown in equation 9, the transmitted sub-carrier $S_I$ is recovered by calculation from $Z_I$ by doing a phase shift of $-\phi_{VPE}$ followed by a division by $I_I G_I$. The phase compensation and the equalisation digital treatments in the circuit 18 that follows the I/Q mismatch compensation block 17 in the base-band digital IC implement these calculations.

If we assume that the amplitude and phase mismatch $a_k$ and $\phi_k$ are small compared to 1, the second order term in $I_k$ can be neglected and the ratio $J_k/I_k$ can be simplified as follows:

$$I_k = \cos(\phi_k) - j \cdot a_k \sin(\phi_k) \approx \cos(\phi_k),$$

$$\frac{J_k}{I_k} = \frac{a_k \cdot \cos(\phi_k) + j \cdot \sin(\phi_k)}{\cos(\phi_k)}$$

$$\Rightarrow A_k = \frac{J_k}{I_k} = a_k + j \cdot \tan(\phi_k)$$

The corrected signal $Z_I$ can then be rewritten as:

$$Z_l = R_l - \sum_{k=-\frac{K}{2}}^{k=\frac{K}{2}} \lambda_{l,k}(a_k + j \cdot \tan(\phi_k)) \overline{R}_{-k} \qquad \text{Equation 10}$$

When there is negligible carrier frequency offset ($\Delta f_C \sim 0$) the coefficient $\lambda_{l,k}$ is equal to 1 for k equal to l and 0 otherwise. Then Equation 8 can be simplified and we obtain the same compensation as in the receiver described in our co-pending European Patent Application N° EP 01401631.5:

$$Z_k = R_k - (a_k + j \cdot \tan(\phi_k)) \overline{R}_{-k} \qquad \text{Equation 11}$$

The complex term $A_k$ or the simplified terms $a_k$ and $\tan(\phi_k)$ are called the I/Q mismatch coefficients and are calculated during a calibration procedure; various calibration procedures are available and a suitable procedure is described below.

Figure 5:
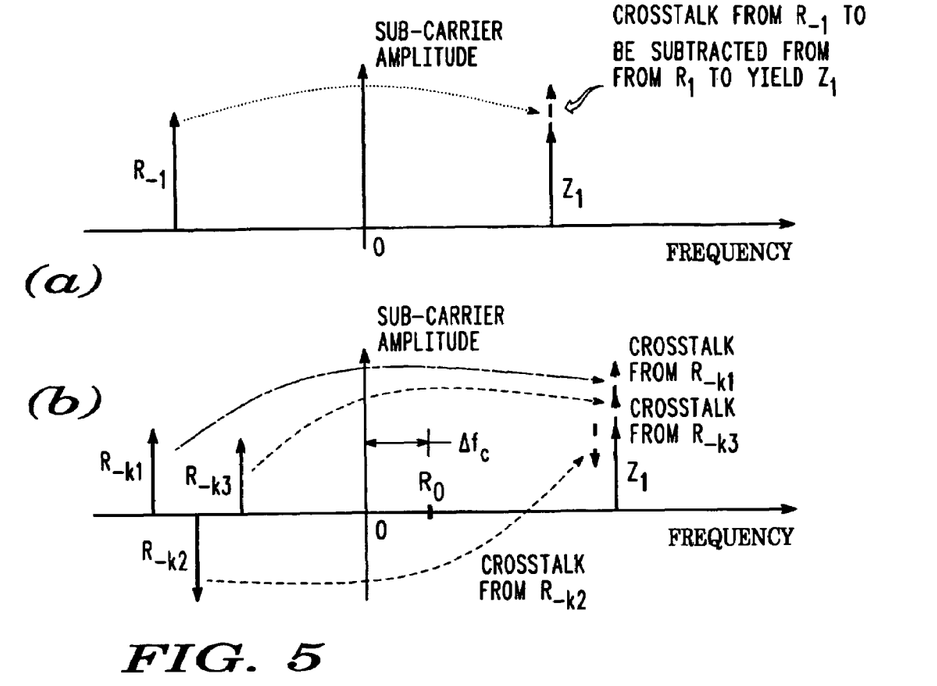
FIG. 5 is a graphical diagram similar to FIG. 4 showing I/Q mismatch cross-talk in operation of the receiver of FIG. 1, both without and with frequency offset.

As shown in the upper part of FIG. 5, each received sub-carrier is compensated for the I/Q mismatch by removing the cross-talk that is generated by a single symmetric sub-carrier when there is no carrier frequency offset.

When the carrier frequency offset becomes significant cross-talk is generated by all the other sub-carriers. However, since the function $|\sin(\pi N . x)/\sin(\pi x)|$ decreases quickly when $|x|$ increases, $|\lambda_{l,k}|$ also decreases quickly with increasing values of $$\left|\frac{k-l}{N} - 2\frac{\Delta f_c}{f_s}\right|.$$

It has been shown by simulation that it is possible to obtain sufficient compensation while reducing the complexity of the implementation by compensating the cross-talk of a limited number of sub-carriers only. For instance, three or even two sub-carriers (out of 64 in Hiperlan 2) are enough in some cases.

As shown in the lower part of FIG. 5, the cross-talk to be subtracted from each received sub-carrier is calculated from a selected number k of other sub-carriers which have the highest $\lambda_{I,k}$ values (see equation 6) which corresponds to $$N\left|\frac{k-l}{N} - 2\frac{\Delta f_c}{f_s}\right|$$

being smaller than a chosen maximum value. For instance the criterion $$N\left|\frac{k-l}{N} - 2\frac{\Delta f_c}{f_s}\right| \leq 2$$

can be selected.

The corrected signal $Z_l$ becomes:

$$Z_l = R_l - \sum_k \lambda_{l,k}(a_k + j.\tan(\phi_k))\overline{R}_{-k} \text{ with} \qquad \text{Equation 12}$$

$$N\left|\frac{k-l}{N} - 2\frac{\Delta f_c}{f_s}\right| \leq \text{max\_value}$$

A calibration procedure is used to calculate the mismatch coefficients $a_k$ and $\tan(\phi_k)$, for each sub-carrier k that are used to implement the I/Q mismatch compensation. The calibration procedure is preferably executed once only, after power up of the system and is carried out before normal data transmission in order to avoid adding any overhead to the normal operation. The calibration method may be changed depending on the actual values of the analogue components mismatch in the various components of the RF front-end. The calibration method described below is similar to that described in our co-pending European Patent Application N° EP 01401631.5.

Figure 6:
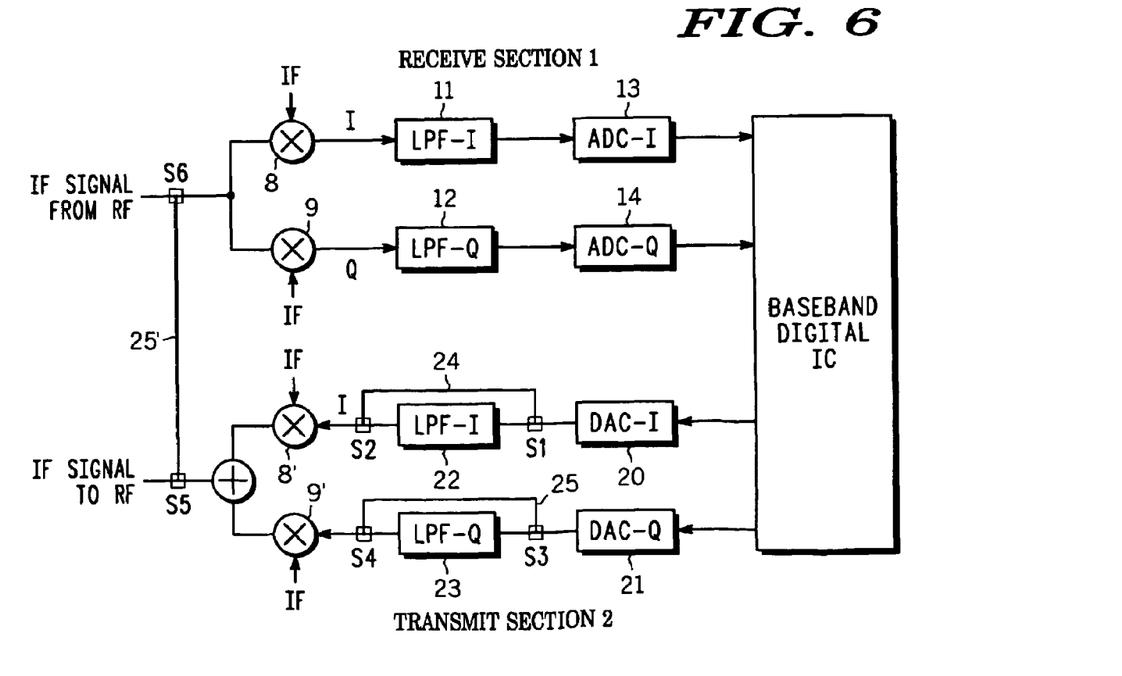
FIG. 6 is a schematic diagram of a calibration configuration of the receiver of FIG. 3.

In FIG. 6, we illustrate by way of example a preferred configuration of the OFDM transceiver enabling the calibration of the I and Q paths. In addition to the receiver section, the transceiver comprises a transmitter section including digital-to-analogue converters ('DACs') 20 and 21 that normally convert digital I and Q transmission signals from the baseband DSP to analogue I and Q signals, transmitter low pass filters 22 and 23 that filter the I and Q transmission analogue signals respectively and IF mixers 8' and 9' that shift the transmitted signal from baseband to an intermediate frequency. During the calibration mode of operation of the transceiver, two training signals $S_{t1}$ and $S_{t2}$ are generated by the base-band DSP and sent through I and Q calibration paths 24, 25 and 25' (shown in thick lines in FIG. 6), which are different from the normal data signal path and are created using switches S1, S2, S3 S4, S5 and S6. This structure is sufficient for the training of the receiver if the transmitter DACs 20 and 21 and the IF mixers 8' and 9' are well matched. However, as described in our co-pending European Patent Application N° EP 01401631.5, further calibration paths (not shown) are preferably provided to invert periodically the route of the I and Q training signals $S_{t1}$ and $S_{t2}$ so as to compensate for residual mismatch of the transmitter DACs 20 and 21 and IF mixers 8' and 9'.

The first training signal $S_{t1}$ is used to measure the crosstalk coefficient for the negative sub-carriers (k=−1 to −K:2). $S_{t1}$ is a time domain signal made of at least one symbol. It can either be stored as a set of time domain samples or be obtained by OFDM modulation of a plurality of stored frequency domain components $D_k = B_k e^{jP_k}$ mapped on sub-carriers of frequency $(f_c + k\, f_s/N)$. In a preferred embodiment, $S_{t1}$ comprises a single OFDM symbol corresponding to the modulation of K/2 non-zero components $D_1$ to $D_{K/2}$ such that $B_k = 1$, $P_k = 0$, and thus $D_k = 1$ for all k from 1 to K/2.

After insertion of the cyclic extension, the I and Q components are obtained and, for the purposes of this embodiment of the present invention, are used to train the receive path (although it would also be possible to use them to train the transmit path). Denoting by $R_k$ and $R_{-k}$ the FFT outputs corresponding to sub-carriers k and −k as described above, the crosstalk coefficients for sub-carrier −k, $a_{-k}$ and $\tan(\phi_k)$ are obtained by the following complex operations:

$$a_{-k} = \Re\left(\frac{R_{-k}}{R_k^*}\right) \text{ and } \tan(\phi_{-k}) = \Im\left(\frac{R_{-k}}{R_k^*}\right) \text{ with } k = 1 \text{ to } K/2$$

and where the asterisk * denotes complex conjugation.

The second training signal $S_{t2}$ is used to measure the crosstalk coefficient for the positive sub-carriers (k=1 to K:2). $S_{t2}$ comprises a single OFDM symbol corresponding to the modulation of K/2 non-zero components $D_{-1}$ to $D_{-K/2}$ such that $B_{-k} = 1$, $P_{-k} = 0$, and thus $D_{-k} = 1$ for all k from −1 to −K/2. In the same way as the first training signal, the crosstalk coefficients for sub-carrier k, $a_k$ and $\tan(\phi_k)$ are obtained by the following complex operations:

$$a_{-k} = \Re\left(\frac{R_k}{R_{-k}^*}\right) \text{ and } \tan(\phi_k) = \Im\left(\frac{R_k}{R_{-k}^*}\right) \text{ with } k = 1 \text{ to } K/2.$$

Figure 7:
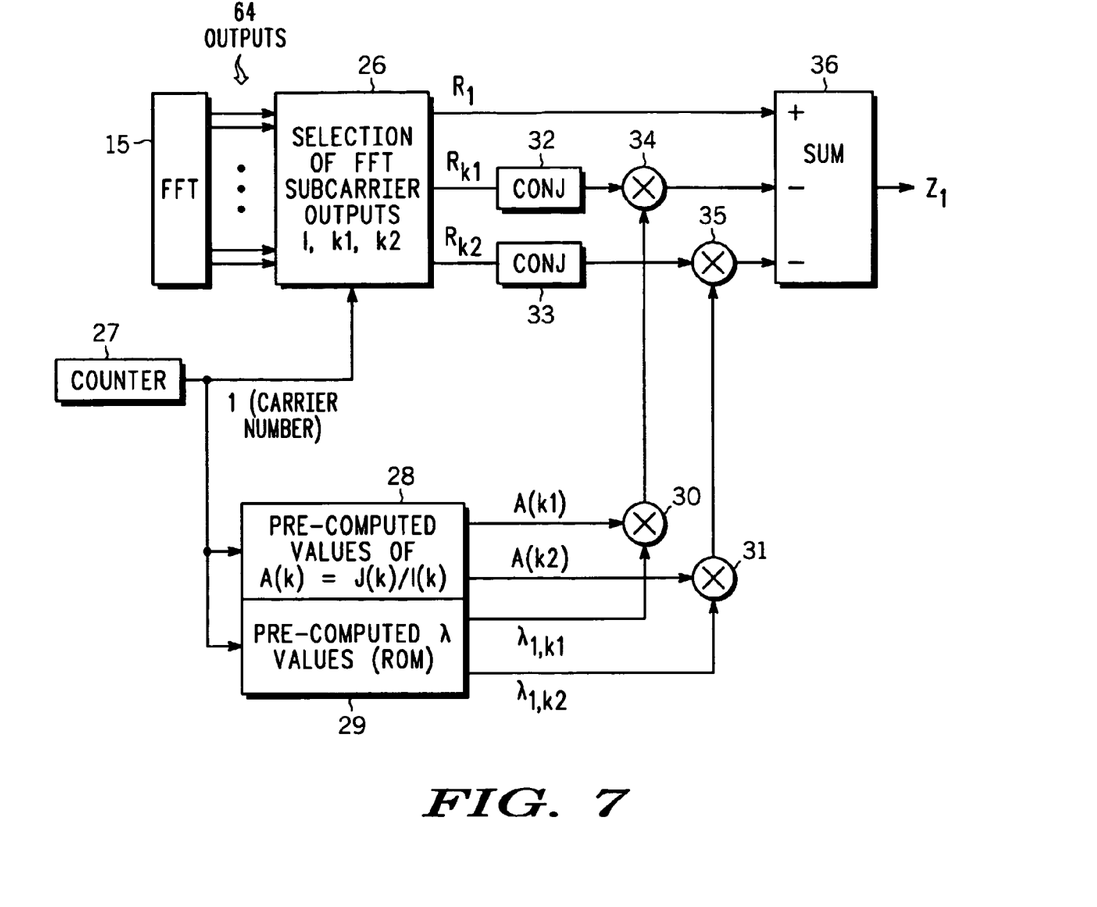
FIG. 7 is a schematic diagram of a compensation circuit in the receiver of FIG. 3 in accordance with a preferred embodiment of the invention.

FIG. 7 illustrates a preferred implementation of the compensation with the chosen maximum value of 1. In this case, the interference from only 2 sub-carriers is removed from each sub-carrier of index I, although it will be appreciated that this implementation can readily be extended to compensation of the cross-talk from a greater number of sub-carriers. The indexes $k_1$ and $k_2$ of these sub-carriers are directly computed for each value of I since the frequency offset and the chosen maximum value are known.

In more detail, the sub-carriers numbers of indexes I, $k_1$ and $k_2$ from the OFDM demodulation FFT circuit 17 are selected by a selection circuit 26 for each value of the index I in turn as defined by a counter 27. In this preferred implementation, the values $\lambda_{I,k1}$ and $\lambda_{I,k2}$ (see equation 6) are pre-computed and stored in a look-up table 28 for the various values of I and of the frequency offset, although it would also be possible to compute them directly as and when needed. The complex numbers $A(k) = J_k/I_k = a_k + j\tan(\phi_k)$ have also been computed during the calibration phase and are stored in another look-up table 29. Then for each FFT sub-carrier output of index I, complex multiplications are performed of $A_{k1}$ by $\lambda_{I,k1}$ in a multiplier 30 and of $A_{k2}$ by $\lambda_{I,k2}$ in a multiplier 31. Complex conjugations of $R_{k1}$ and $R_{k2}$ are performed in circuits 32 and 33 and the results are multiplied by the outputs of multipliers 30 and 31 in multipliers 34 and 35 respectively. Two complex subtractions of $R_{k1}$ and $R_{k2}$ from $R_I$ are performed in a sum circuit 36 to obtain the compensated symbol $Z_I$.

The number of operations per symbol depends on the chosen maximum value, but the resulting complexity is typically small compared to other blocks like FFT 15 and in any case much smaller than digital I/Q generation complexity.

In order to evaluate the effect of the I/Q mismatch compensation of the above embodiments of the invention, simulations of packet error rate (PER) were performed on a Hiperlan2 simulator with a carrier frequency offset ranging from −310 kHz to +310 kHz, which is a range wider than the ETSI specifications (40 PPM between transmitter and receiver clock, corresponding to +/− 200 kHz with a 5 GHz channel central frequency).

Figure 8:
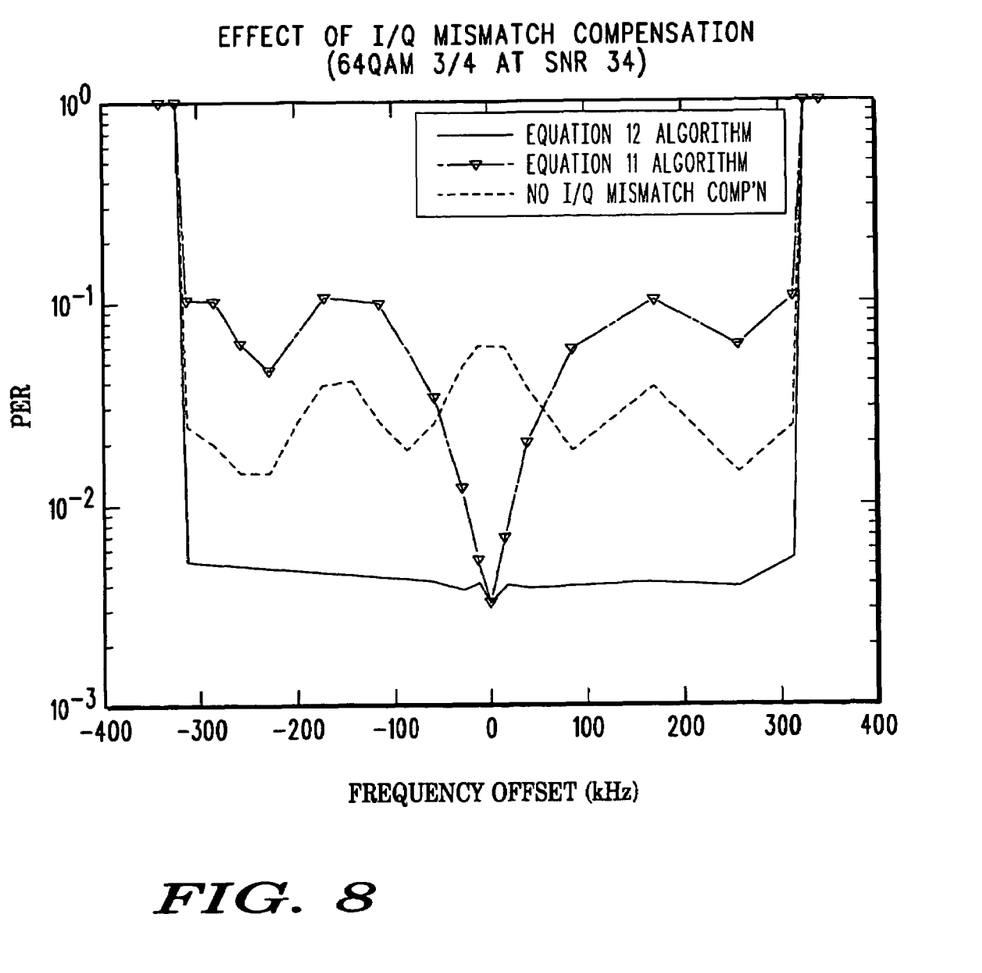
FIG. 8 is a graphical diagram showing simulated packet error rates as a function of frequency offset for different compensation configurations.

The results from simulations that implement the I/Q mismatch compensation algorithm described by Equation 12 (with max_value equal to 1) are shown in FIG. 8. For comparison, the results from simulations without I/Q mismatch compensation and from simulations implementing the algorithm described by Equation 11 are shown in the same Figure.

It will be noted that when the carrier frequency offset is close to zero, the algorithm described by Equation 12 and that described by Equation 11 produce the same improvement in data transmission and the PER is substantially lower than that obtained without I/Q mismatch compensation.

However, when the carrier frequency offset becomes bigger (more than a few tens of kHz) the data transmission quality becomes much better for the algorithm described by Equation 12 than that described by Equation 11. Above a frequency offset of 70 kHz, it can be seen that the algorithm described by Equation 11 can even degrade the data transmission quality compared to no I/Q mismatch compensation at all. This is explained by the fact that the compensation method calculates the cross-talk to be removed from the received sub-carrier using a single symmetric sub-carrier despite the fact that the cross-talk was generated by several other sub-carriers.

The invention claimed is:

1. A receiver for an orthogonal frequency division multiplex radio signal in which a carrier frequency is modulated by sub-carrier signals ($S_I$) coded with data, the receiver comprising analogue signal processing means for combining a received radio frequency signal with at least one reference frequency signal and producing analogue signals (I-Rx, Q-Rx) in phase quadrature whose frequencies are functions of frequency differences between said radio frequency signal and said reference frequency signal, analogue-to-digital converter means for converting said analogue signals to phase quadrature digital signals ($x_I(n)$, $x_Q(n)$), and digital signal processing means including demodulator means for reproducing said sub-carrier signals, mismatch compensation means for combining each of said reproduced sub-carrier signals ($R_I$) according to a mismatch coefficient (A(k)) with another of said reproduced sub-carrier signals ($R_{-I}$) whose sub-carrier frequency is symmetrical therewith and compensating for offset ($\Delta f_c$) of said reference frequency relative to said carrier frequency, and decoding means for recovering data from the reproduced and compensated sub-carrier signals, characterised in that said compensation means is arranged to combine each of said reproduced sub-carrier signals ($R_I$) with a plurality of said reproduced sub-carrier signals ($R_{-I}$, $R_k$) according to respective values of said mismatch coefficient (A(k)) and according to a respective frequency offset coefficient ($\lambda_{I, k}$) that is a function of an estimated value of said offset ($\Delta f_c$) of said reference frequency relative to said carrier frequency.

2. A receiver as claimed in claim 1, wherein said compensation means is arranged to combine each of said reproduced sub-carrier signals ($R_I$) with a limited number only of said reproduced sub-carrier signals ($R_{-I}$, $R_k$).

3. A receiver as claimed in claim 1, wherein said compensation means is arranged to combine each of said reproduced sub-carrier signals ($R_I$) with only those of said reproduced sub-carrier signals ($R_{-I}$, $R_k$) for which a decision parameter $$N\left|\frac{k-l}{N} - 2\frac{\Delta f_c}{f_s}\right|$$

is less than a threshold value, where N is the number of sub-carriers used for the OFDM modulation, I is the index of the sub-carrier ($R_I$) subjected to compensation, k is the index of the cross-talk sub-carrier ($R_k$) considered for compensation, $\Delta f_c$ is the offset of said reference frequency relative to said carrier frequency and $f_s$ is the sampling frequency used for the OFDM modulation.

4. A receiver as claimed in claim 3 wherein said threshold value is at least approximately equal to 2.

5. A receiver as claimed in claim 3 wherein said threshold value is such that each of said reproduced sub-carrier signals ($R_I$) is combined with a number of said reproduced sub-carrier signals ($R_k$) between 2 and 4.

6. A receiver as claimed in claim 1, wherein said frequency offset coefficients ($\lambda_{I, k}$) satisfy at least approximately the relation $$\lambda_{I,k} = \frac{1}{N} e^{j\pi(N-1)\left(\frac{k-l}{N} - 2\frac{\Delta f_c}{f_s}\right)} \frac{\sin\left(\pi N\left(\frac{k-l}{N} - 2\frac{\Delta f_c}{f_s}\right)\right)}{\sin\left(\pi\left(\frac{k-l}{N} - 2\frac{\Delta f_c}{f_s}\right)\right)}$$

where N is the number of sub-carriers used for the OFDM modulation, I is the index of the sub-carrier ($R_I$) subject to compensation, k is the index of the cross-talk sub-carrier ($R_k$) considered for use in compensation, $\Delta f_c$ is the offset of said reference frequency relative to said carrier frequency and $f_s$ is the sampling frequency used for the OFDM modulation.

7. A receiver as claimed in claim 1, wherein said compensation means includes conjugate means for producing a complex conjugate value ($\overline{R}_{-k}$) of said plurality of reproduced sub-carrier signals ($R_k$) and multiplying means for multiplying said complex conjugate value ($\overline{R}_k$) by a compensation value that is a function of said frequency offset coefficient ($\lambda_{I, k}$).

8. A receiver as claimed in claim 1, wherein said compensation value is arranged to be a function of said mismatch coefficient (A(k)) as well as of said frequency offset coefficient ($\lambda_{I, k}$).

9. A receiver as claimed in claim 1, wherein said mismatch coefficient (A(k)) is arranged to be at least approximately equal to $a_k + j \tan(\phi_k)$, where $a_k$ is the amplitude mismatch and $\phi_k$ the phase mismatch that said analogue processing means presents to the phase quadrature channels (I-Rx, Q-Rx) for a sub-carrier signal $S_k$.

10. A receiver as claimed in claim 1, wherein said compensation means includes storage means for storing pre-computed values of said frequency offset coefficient ($\lambda_{I,k}$) as a function of different values of said offset ($\Delta f_c$) of said reference frequency relative to said carrier frequency for different values of I and k and for selecting one of said pre-computed values as a function of an estimated value of said offset ($\Delta f_c$) and of I and k.

11. Communication apparatus comprising a receiver as claimed in claim 1 and a transmitter for generating an orthogonal frequency division multiplex radio signal, wherein said compensation means comprises calibration means for passing an orthogonal frequency division multiplex signal generated by said transmitter to said receiver and for responding to signals reproduced by said receiver therefrom mismatch coefficient (A(k) in combining said reproduced sub-carrier signals ($R_I$) with said reproduced sub-carrier signals ($R_k$).

* * * * *